Dec. 1, 1959  F. P. SHARPE  2,915,164
PIERCING AND CHAMFERING MACHINE
Filed Oct. 11, 1954  5 Sheets-Sheet 1

INVENTOR.
FREDERICK P. SHARPE.
BY
ATTYS.

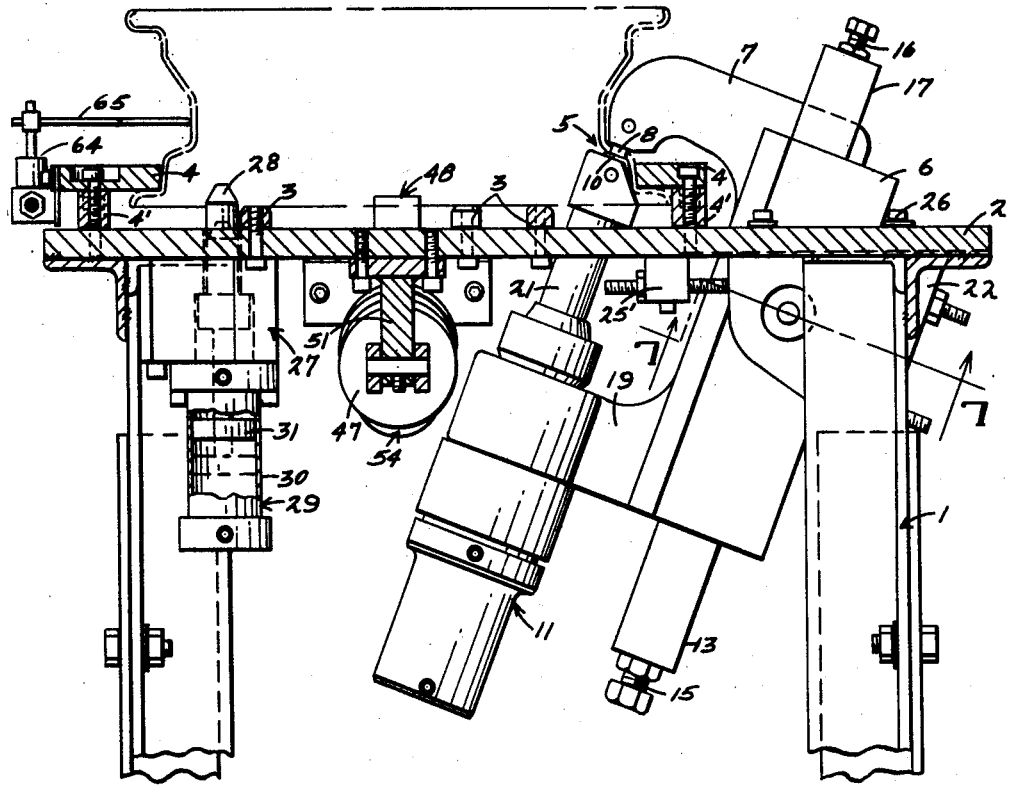
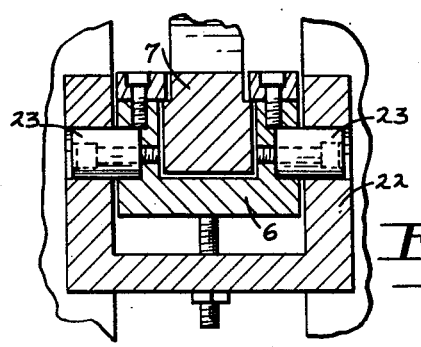
Fig. 3
Fig. 7
INVENTOR.
FREDERICK P. SHARPE.
BY
ATTYS.

Dec. 1, 1959    F. P. SHARPE    2,915,164
PIERCING AND CHAMFERING MACHINE
Filed Oct. 11, 1954    5 Sheets-Sheet 4

INVENTOR.
FREDERICK. P. SHARPE.
BY
ATTYS.

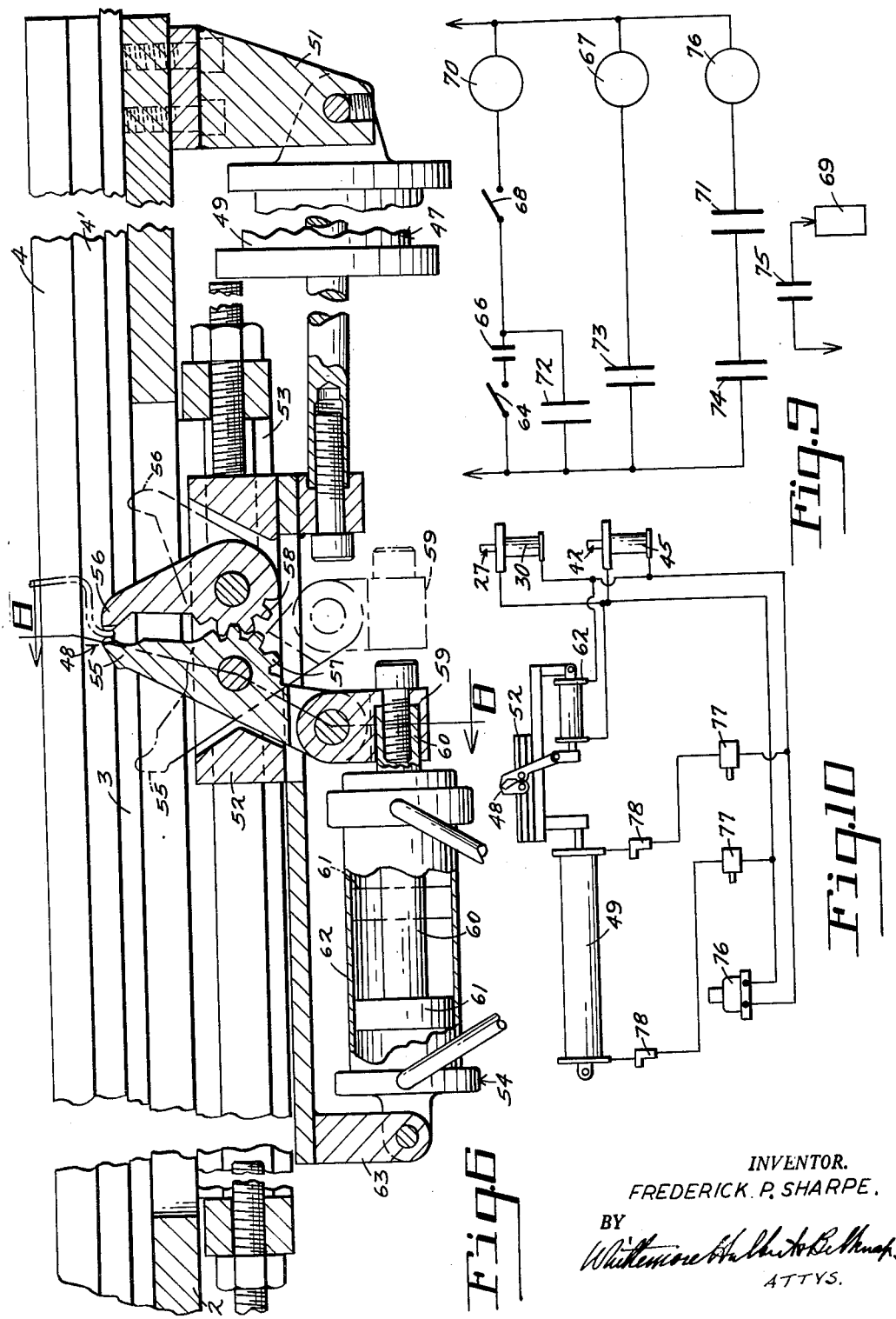

United States Patent Office 2,915,164
Patented Dec. 1, 1959

2,915,164

PIERCING AND CHAMFERING MACHINE

Frederick P. Sharpe, Dearborn, Mich., assignor to Kelsey-Hayes Company, a corporation of Delaware Application October 11, 1954, Serial No. 461,429

3 Claims. (Cl. 198—19)

The invention relates to piercing and chamfering machines and refers more particularly to machines for piercing and chamfering tire carrying rims to form chamfered valve stem holes.

The invention has for one of its objects to provide an automatic piercing and chamfering machine which is reliable and efficient in operation.

The invention has for another object to provide a piercing and chamfering machine having a guide along which the articles are movable, piercing and chamfering devices spaced longitudinally of the guide, and means for transferring the articles from piercing position to chamfering position, the latter means serving to hold the articles from angular movement so that the chamfering device registers with the hole formed by the piercing device.

These and other objects of the invention will become apparent from the following description taken in connection with the accompanying drawings in which—

Figure 1:
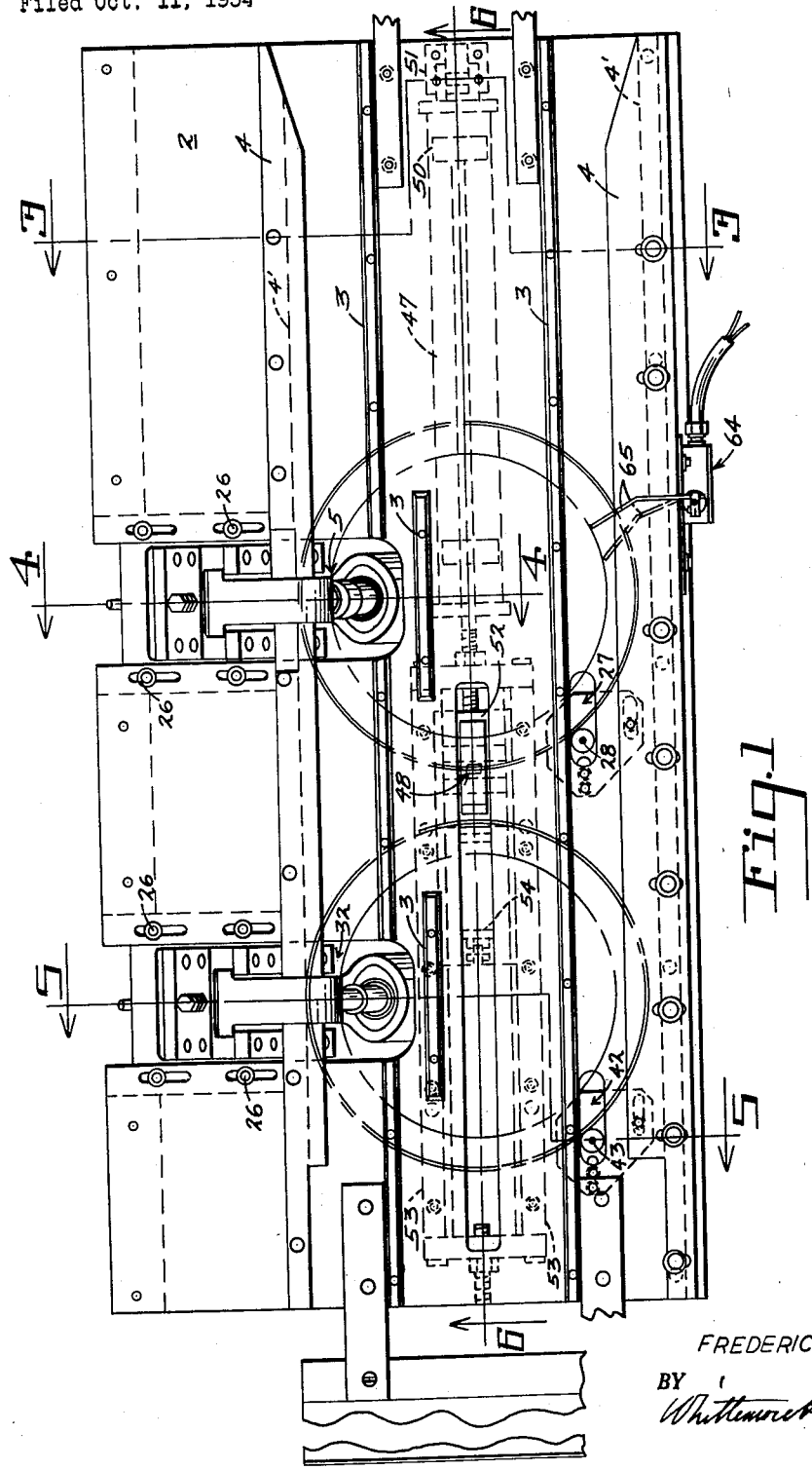
Figure 1 is a plan view of a piercing and chamfering machine embodying the invention.
Figure 2:
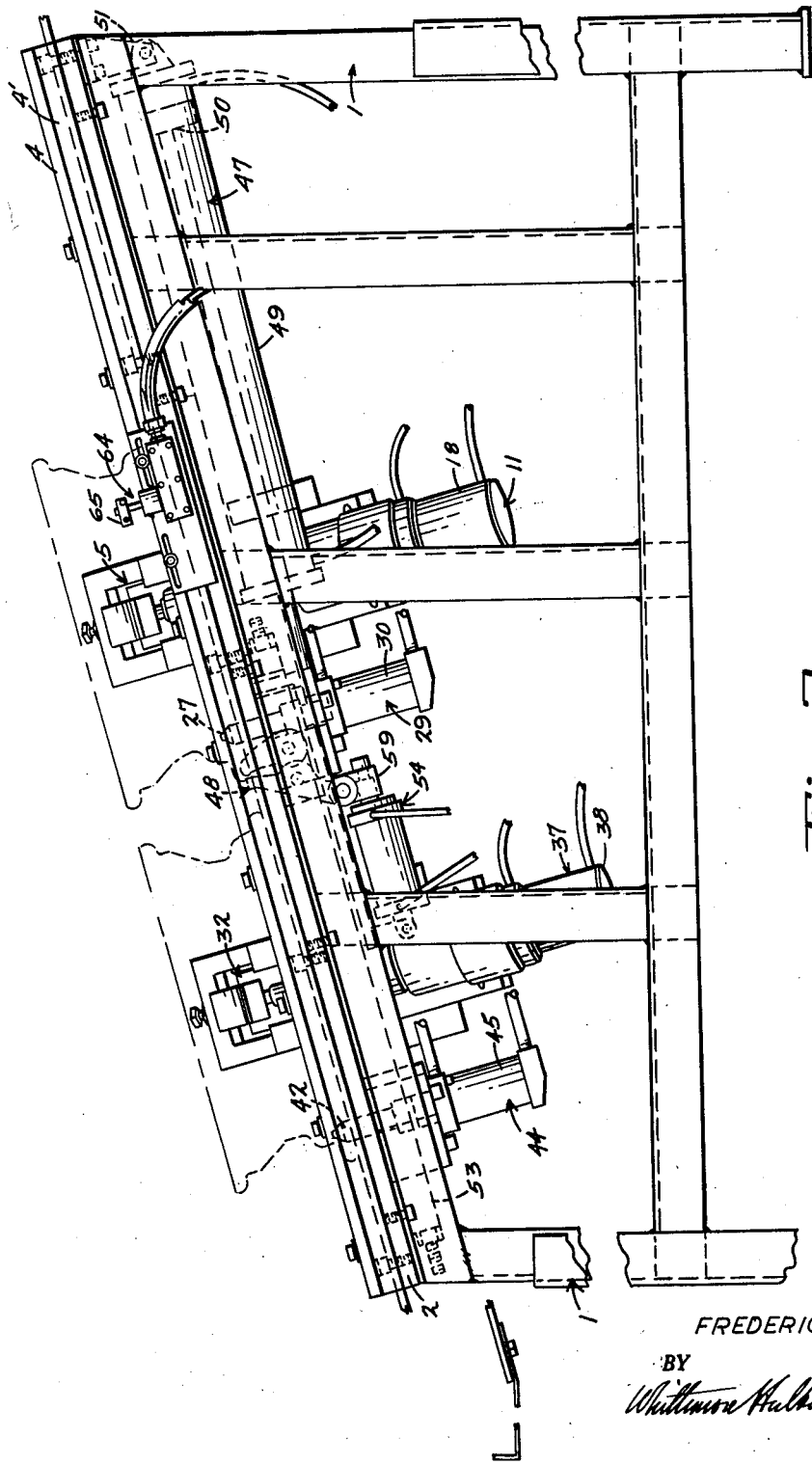
Figure 2 is a side elevation thereof.
Figure 5:
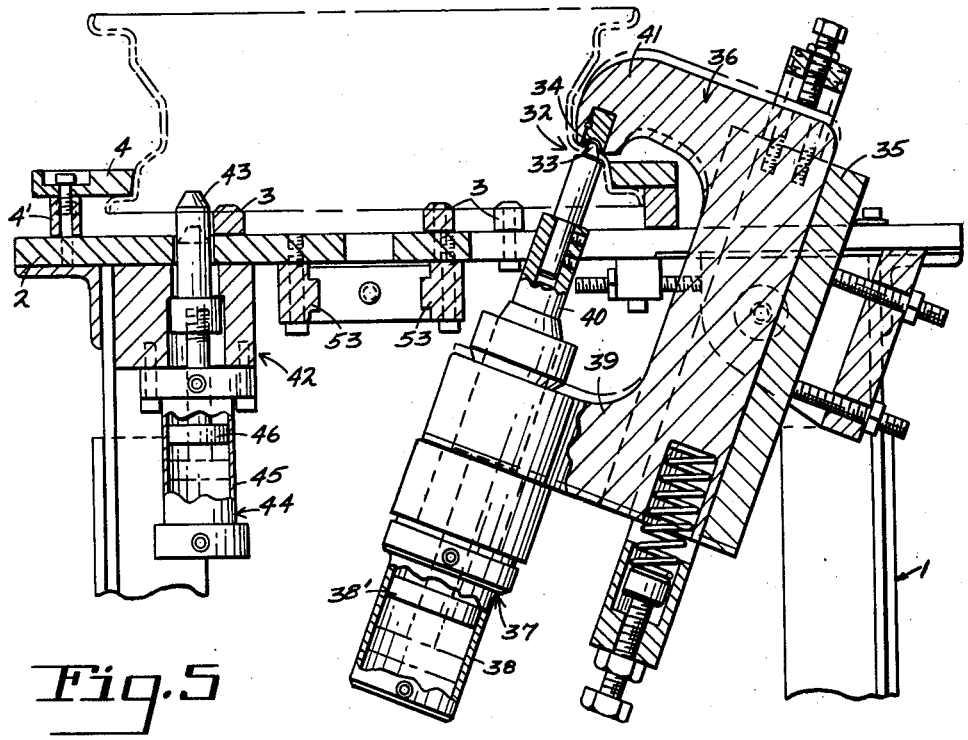
Figures 4, 8:
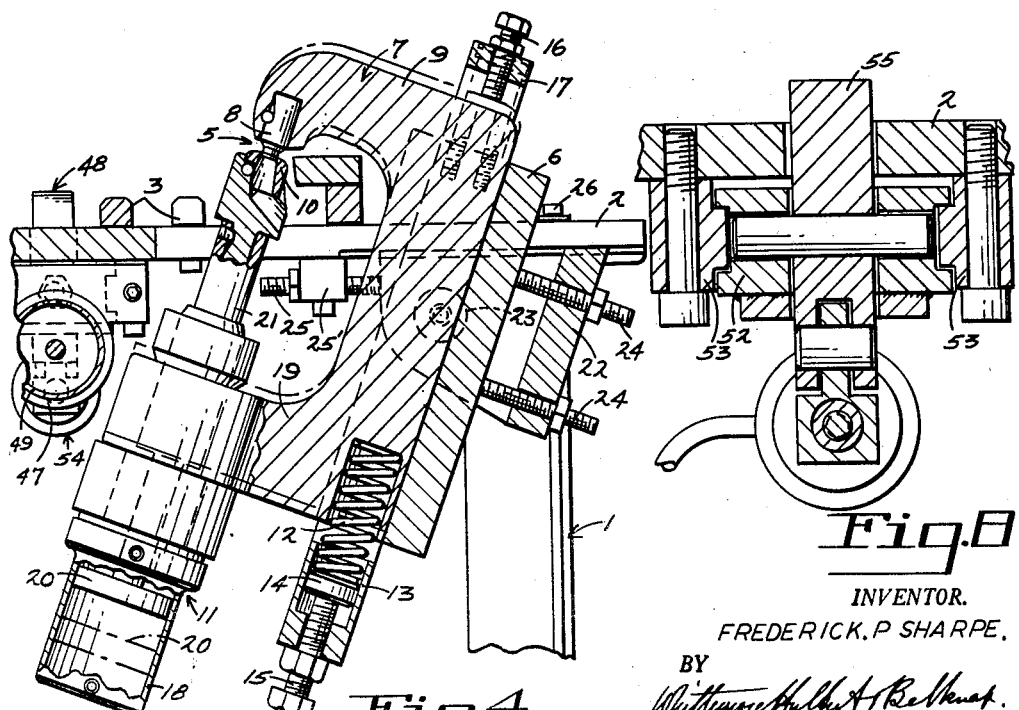

Figures 3, 4, 5 and 6 are cross-sections on the lines 3—3, 4—4, 5—5 and 6—6, respectively, of Figure 1;

Figure 7 is a cross-section on the line 7—7 of Figure 3;

Figure 8 is a cross section on the line 8—8 of Figure 6;

Figure 9 is a schematic wiring diagram;

Figure 10 is a schematic pneumatic diagram.

The piercing and chamfering machine as illustrated is designed to pierce and chamfer tire carrying rims of the drop center type to form chamfered valve stem holes. The machine comprises the frame 1, the downwardly and forwardly inclined table 2 on the frame, and the bars 3 and 4 for supporting and guiding the rims during their downward movement under the influence of gravity. The bars 3 extend longitudinally of and are mounted on the table and are spaced from each other a distance less than the diameter of the rims to engage the lower edges of the lower beads of the rims. The bars 4 also extend longitudinally of the table and are mounted on the spacers 4' which are mounted on the table to clear the rims, the bars 4 being spaced from each other to extend over the lower tire retaining flanges of the rims and to engage the diametrically opposite parts of the adjacent tire bead seats of the rims. One of the bars 4 is preferably laterally adjustably mounted on its spacers 4' to provide for accurately spacing the bars 4 from each other. With this construction, the bars 3 and 4 serve to support and guide the rims during their downward movement.

For the purpose of piercing the rims, the piercing device 5 is provided. This piercing device is of the same construction as shown in my copending application Serial No. 395,004, filed November 30, 1953, on Piercing Machine. The device is mounted on the frame 1 and table 2 at the side of the latter opposite the laterally adjustable bar 4 to engage the portion of the lower side wall of the well of the rim laterally opposite the rim axis. The device comprises the channel-shaped guide 6, the yoke 7 slidable in the guide, the punch 8 secured to the upper arm 9 of the yoke, the anvil 10 in axial alignment with the punch, and the hydraulic actuator 11 for relatively moving the punch and anvil toward and away from each other and a rim. The yoke 7 is resiliently urged upwardly by means of the coil spring 12 which extends into a bore in the yoke and abuts the yoke at the end of the bore and which also extends into an axially aligned bore in the fixture 13 and abuts the head 14 in the latter bore. The fixture is secured to the lower end of the guide 6 and the head is adjustable by means of the screw 15 threaded in the fixture and abutting the head whereby the force exerted by the spring may be varied. Upward movement of the yoke is limited by the screw 16 threaded in the fixture 17 which is secured to the upper end of the guide 6.

The hydraulic actuator 11 comprises the cylinder 18 fixedly secured to the lower arm 19 of the yoke 7, the piston 20 reciprocable within the cylinder and the piston rod 21 to the lower end of which the piston is secured and to the upper end of which the anvil 10 is secured. Assuming the parts to be in off position with the punch 8 in its uppermost position and the anvil 10 in its lowermost position, upon the entrance of liquid under pressure into the lower end of the cylinder 18 below the piston 20 the piston is raised by the liquid acting on the lower side of the piston thereby raising through the piston rod 21 the anvil 10 against the lower side wall of the well of the rim and clamping the lower side wall against the bars 4. The yoke 7 is moved downwardly by the liquid acting on the lower end of the cylinder and the punch 8 is forced through the lower side wall of the well thereby forming the valve stem hole. Then upon exhaust of the liquid from the lower end of the cylinder 18 and entrance of liquid under pressure into the upper end of the cylinder above the piston 20, the parts are returned by the liquid acting on the upper side of the piston and the upper end of the cylinder to their off positions in which they are held by the coil spring 12.

To accurately locate the punch 8 and anvil 10 to move at right angles to the side wall of the well of the rim, the guide 6 is angularly adjustably mounted on the frame 1 and table 2. In detail, 22 is a channel-shaped bracket secured to the frame and table, and 23 are axially aligned gudgeons extending from the side flanges of the bracket and pivotally mounting the guide on the bracket 24 are set screws threaded in the base of the guide above and below the gudgeons for angularly adjusting the guide about the axes of the gudgeons relative to the bracket.

To accurately locate the punch 8 and the anvil 10 to engage the side wall of the well of the rim at the desired radial distance from the axis of the rim, I have provided the set screws 25 threaded in the blocks 25' and abutting the bracket 22. The blocks are fixedly secured to the under side of the table 2 and the set screws abut the side flanges of the bracket, the upper portions of these side flanges being adjustably secured to the under side of the table by the bolts 26 which extend through transverse slots in the table.

For the purpose of positioning the rims for engagement by the piercing device 5 and also controlling their downward movement or feed under gravity, I have provided the stop device 27. This stop device comprises the stop pin 28 extending through the table 2 and the fluid pressure operated actuator 29 secured to the under side of the table with its axis offset from the center line of the table. The actuator is adjustable longitudinally of the table to accurately locate the stop pin to thereby accurately position the rims with respect to the piercing device. The actuator is an air cylinder 30 and piston 31 reciprocable within the cylinder and connected to the stop pin. The cylinder is provided with suitable ports at its upper and lower ends for the passage of compressed air into and from the cylinder.

For the purpose of chamfering the rims and more particularly chamfering the metal of the rims bordering the pierced holes, the chamfering device 32 is provided, this device being mounted on the frame 1 and table 2 at the same side as and below the piercing device 5 a distance greater than the diameter of the rim being pierced and chamfered. The chamfering device with the exception of the punch 33 and anvil 34 is of the same construction as the piercing device 5 and comprises the angularly adjustable channel-shaped guide 35, the yoke 36 slidable in the guide and the hydraulic actuator 37. The hydraulic actuator comprises the cylinder 38 fixedly secured to the lower arm 39 of the yoke 36, the piston 38′ reciprocable within the cylinder and the piston rod 40 to the lower end of which the piston is secured and to the upper end of which the punch 33 is secured. The anvil 34 is secured to the upper arm 41 of the yoke 36. The punch 33 and anvil 34 are accurately located to move at right angles to and engage the side wall of the rim at the desired radial distance from the axis of the rim in the same manner as the punch and anvil of the piercing device.

With this construction it will be seen that the rim is pierced to form the valve stem hole by means of a punch movable in the well of the rim laterally outwardly with respect to the side wall of the well or downwardly with respect to the table of the machine and that the rim is chamfered by movement of a punch in the opposite direction so that any burr which might be formed by the piercing operation will be removed by the chamfering operation.

For the purpose of positioning the rims for engagement by the chamfering device, I have provided the stop device 42 of the same construction as the stop device 27 and comprising the stop pin 43 extending through the table 2 and the fluid pressure operated actuator 44 longitudinally adjustably secured to the under side of the table. The actuator is an air cylinder 45 and piston 46 reciprocable within the cylinder and connected to the stop pin. The cylinder is provided with suitable ports in its upper and lower ends for the passage of compressed air into and from the cylinder.

For the purpose of transferring a rim from piercing position to chamfering position and for also holding the rim from angular movement while being transferred, I have provided the fluid pressure operated transfer actuator 47 and the rim clamp 48. The actuator comprises an air cylinder 49 and piston 50 reciprocable within the air cylinder, the latter extending longitudinally of and below the table 2 with its axis below the table center line. The air cylinder is pivotally connected at its upper end to the bracket 51 which is secured to the lower side of the table at its upper end. The piston is connected at its lower end to the slide 52 carried by the guides 53 extending longitudinally of and secured to the under side of the table. The slide 52 carries the clamp 48 and the fluid pressure operated actuator 54 for operating the clamp. The clamp comprises the jaws 55 and 56 pivoted to the slide and movable from a position engaging the lower bead of the lower tire retaining flange of a rim to a position below the upper surfaces of the guide bars 3 clearing a rim. These jaws have the intermeshing teeth 57 and 58 respectively concentric with the axes of the jaw pivots and the jaw 55 is extended downwardly and pivotally connected to the head 59 which is secured to the piston rod 60 of the piston 61 reciprocable within the air cylinder 62 of the actuator 54. The air cylinder at its end remote from the head 59 is pivoted to the bracket 63 carried by the slide. Both of the air cylinders 49 and 62 are provided with ports in their opposite ends for the passage of compressed air into and from the cylinders. With this construction, the rim is transferred from piercing position to chamfering position and held from angular movement so that the chamfering device registers with the hole formed by the piercing device.

To control the operation of the piercing and chamfering machine, I have provided the limit switch 64 which is adapted to be closed by a rim moving downwardly over the table 2 by gravity. The switch is of conventional construction and is secured to the laterally adjustable bar 4 to locate the actuating arm 65 of the switch in the path of the base of the well of the rim to be engaged by the base just prior to the engagement of the rim with the stop pin 28 and swung to position, closing the switch at the instant the rim engages the stop pin.

As shown schematically in Figure 9 the limit switch 64 is in series with the normally closed contacts 66 of the time delay 67, the normally closed micro switch 68 of the hydraulic unit 69 and the solenoid of the control relay 70. The time delay, the hydraulic unit, and the control relay are housed in a panel box at the side of the piercing and chamfering machine.

The time delay is of the dash pot type and of conventional construction known as the Agastat time delay and in addition to having the normally closed contacts 66 has the normally open contacts 71.

The hydraulic unit is self-cycling and of conventional construction known as the Hannafin unit. The hydraulic unit controls the flow of liquid under pressure to the lower and upper ends of the cylinders 18 and 38 of the piercing and chamfering devices 5 and 32, respectively, and the flow of the liquid from these ends. In operation, the hydraulic unit first supplies liquid under relatively low pressure to the lower ends of the cylinders 18 and 38 below their pistons thereby moving the punches 8 and 33 and their associated anvils 10 and 34 against opposite sides of the lower side wall of the rim well. The hydraulic unit then supplies liquid under relatively high pressure to the lower ends of the cylinders thereby moving the punches relative to their associated anvils to pierce and chamber the side wall of the rim well. Then the hydraulic unit supplies liquid under pressure to the upper ends of the cylinders above their pistons and allows the liquid to flow from the lower ends of the cylinders so that the punches and anvils are withdrawn to clear the lower side wall of the rim well. During the period liquid under relatively high pressure is being supplied to the lower ends of the cylinders, the liquid pressure in the hydraulic unit is being built up and when this pressure becomes predetermined the micro switch 68 is automatically opened. Then liquid under pressure is supplied to the upper ends of the cylinders and the piercing and chamfering devices are returned to their original or starting positions after which the micro switch is automatically closed.

The control relay is of conventional construction and has the contactors 72, 73, 74 and 75.

The contactor 72 is parallel to the limit switch 64 and the time delay contacts 66 so that when the contactor 72 is closed it shunts the limit switch 64 and the time delay contacts 66 and holds closed the circuit including the micro switch 68 and the solenoid control relay 70. The contactor 73 is in series with the solenoid of the time delay 67 so that when this contactor 73 is closed the solenoid of the time delay is energized and opens the time delay contacts 66 and closes the time delay contact 71. The contactor 74 is in series with the contacts 71 of the time delay 67 and the solenoid of the solenoid valve 76. This solenoid valve is housed in the panel box housing the time delay, the hydraulic unit, and the control relay, and is a four-way solenoid valve of conventional construction known as the Ross four-way solenoid valve. The valve controls the flow of compressed air to the opposite ends of the cylinders 30 and 45 of the stop devices 27 and 42, respectively, the opposite ends of the clamp operating cylinder 62 and the opposite ends of the transfer cylinder 49. The contactor 75 is in another circuit including the relay of the hydraulic unit 69 so that when the contactor 75 is closed the operation of the hydraulic unit is started.

To control the operation of the transfer cylinder 49, I have provided in each of the compressed air lines leading to the ends of the cylinder the air sequence valve 77 and the speed control valve 78. The sequence valve 77 is of conventional construction, such as a Logan or Ross air sequence valve, and controls the timing of flow of air from the end of the cylinder to which is connected the line having the sequence valve. The speed control valve 78 is of conventional construction, such as a Ross speed control valve, and controls the flow of air through the line having the speed control valve.

In operation, as a rim moves downwardly along the table the rim closes the limit switch 64 at the time the rim comes to rest against the stop pin 28. The limit switch closes the solenoid of the control relay 70 and this control relay, upon energization of its solenoid, closes the contactors 72, 73, 74 and 75. When the contactor 73 is closed, the solenoid of the time delay 67 is energized so that the time delay opens the contacts 66 and closes the contacts 71. The contactor 72 having been closed, the circuit including the solenoid of the control relay 70 remains closed. The contactor 74 and the contacts 71 having been closed, the circuit including the solenoid of the solenoid valve 76 is closed and the solenoid is energized, placing the valve in operation to control the flow of compressed air. The contactor 75 having been closed, operation of the hydraulic unit 69 is started to control the flow of liquid under pressure. The arrangement is such that the air and hydraulic cycles are started at the same time.

The solenoid valve first controls the flow of compressed air to the upper ends of the cylinders 30 and 45 and to the rear end of the cylinder 62 to lower the stop pins 28 and 43 and move the clamping jaws 55 and 56 of the clamp 48 into engagement with the lower bead of the rim resting against the stop pin 28, the clamping taking place before the stop pins become fully disengaged from the rim. During this period of time, the hydraulic unit 69 controls the flow of liquid to the lower ends of the cylinders 18 and 38 of the piercing device 5 and chamfering device 32, respectively, to effect the piercing of the rim resting against the stop pin 28. When the liquid in the hydraulic unit reaches a predetermined pressure after the piercing, the micro switch 68 is automatically opened. The parts of the piercing and chamfering devices are then returned to their original positions after which the micro switch is automatically closed. The rearward movement of the piston in the transfer cylinder 49 is then begun, the start of this movement being controlled by the air sequence valve 77 in the line leading to the front end of the cylinder. The speed of movement of this piston is controlled by the speed control valve 78 in the same line. The contactors 72, 73, 74 and 75 having been opened by opening of the micro switch, the solenoid valve 76 then controls the movement of compressed air to the lower ends of the cylinders 30 and 45 and the front end of the cylinder 62, the pistons in the cylinders 30 and 45 raising the stop pins 28 and 43 and the piston in the cylinder 62 returning the clamp jaws to off position releasing the rim. The piston in the transfer cylinder 49 is then returned to its original position as controlled by the air sequence valve 77 and the speed control valve 78 in the line leading to the rear end of the cylinder 49. At this time the parts are in their original positions and in condition for the next cycle of steps, at which time a rim is resting against the stop pin 28 in piercing position and a pierced rim is resting against the stop pin 43 in chamfering position. As a result, during the next cycle one rim is pierced and a pierced rim is chamfered at the same time.

What I claim as my invention is:

1. In a machine for performing successive operations on work pieces of the type including a guide for the work pieces and work performing devices at spaced work stations along the guide, the combination of stop pins engageable with the work pieces for locating the latter at the work stations, means for moving the stop pins from operative position engageable with the work pieces to inoperative position clearing the work pieces, and means for transferring the work pieces from one station to the other when the stop pin associated with said one station is in inoperative position including a reciprocable clamping device having cooperating jaws for gripping a work piece and means for reciprocating said clamping device, said jaws firmly gripping the work piece to hold it from rotation during transfer.

2. In a machine for performing successive operations on rims of the type including a guide for the rims and work performing devices at spaced work stations along the guide, the combination of stop pins engageable with the rims for locating the latter at the work stations, said stop pins being movable from operative position engageable with the rims to inoperative position clearing the rims, means for transferring the rims from one station to the other when said stop pins are in inoperative position including a reciprocable clamp having jaws movable to gripping and release positions relative to a rim, means for moving said jaws to gripping position relative to a rim at one station and subsequently moving said stop pins to inoperative position, means for moving said clamp with the gripped rim in one direction to transfer the gripped rim to the other station, said jaws firmly gripping the rim to hold it from rotation during transfer, means for returning said stop pins to operative position and for moving said jaws to release position after return of said stop pins to operative position and transfer of the rim to said other station, and means for moving said clamp in the other direction following movement of said jaws to release position.

3. In a machine for performing successive operations on rims of the type including a guide for the rims and work performing devices at spaced worked stations along the guide, the combination of stop pins engageable with the rims for locating the latter at the work stations, said stop pins being movable from operative position engageable with the rims to inoperative position clearing the rims, means for transferring the rims from one station to the other when said stop pins are in inoperative position including a reciprocable clamp having jaws movable to gripping and release positions relative to a rim, second means for moving said jaws to gripping position relative to a rim at one station and subsequently moving said stop pins to inoperative position, mechanism for moving said clamp with the gripped rim in one direction to transfer the gripped rim to the other station, third means automatically operated in timed relation to and after the operation of said second means for actuating said mechanism, fourth means for returning said stop pins to operative position and for moving said jaws to release position after return of said stop pins to release position and transfer of the rim to said other station, means automatically operated in timed relation to and after the operation of said mechanism for actuating said fourth means, and means for moving said clamp in the other direction following movement of the jaws to release position.

References Cited in the file of this patent

UNITED STATES PATENTS

| | | |
|---|---|---|
| 1,856,726 | Poole | May 3, 1932 |
| 1,993,754 | Smith | Mar. 12, 1935 |
| 2,005,522 | Holm | June 18, 1935 |
| 2,570,589 | Phillips | Oct. 9, 1951 |
| 2,771,173 | Sharpe | Nov. 20, 1956 |